July 18, 1950          L. WILPUTTE          2,515,814
UNDERFIRED REGENERATIVE COKE-OVEN BATTERY
Filed June 6, 1944          2 Sheets-Sheet 1
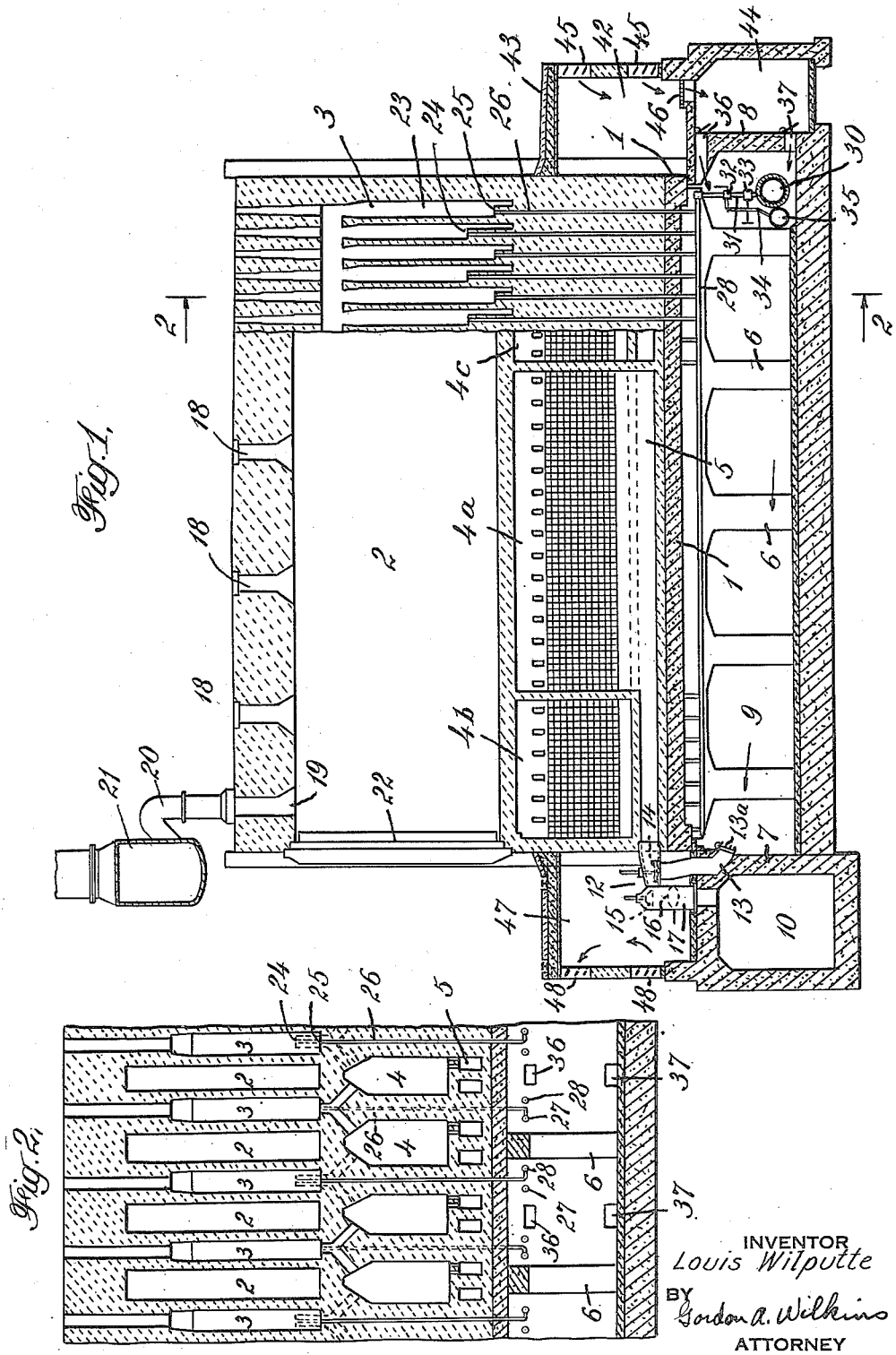
INVENTOR
Louis Wilputte
BY
Gordon A. Wilkins
ATTORNEY July 18, 1950  L. WILPUTTE  2,515,814
UNDERFIRED REGENERATIVE COKE-OVEN BATTERY
Filed June 6, 1944  2 Sheets-Sheet 2

INVENTOR
Louis Wilputte
BY Gordon A. Wilkins
ATTORNEY

Patented July 18, 1950

2,515,814

UNITED STATES PATENT OFFICE 2,515,814

UNDERFIRED REGENERATIVE COKE-OVEN BATTERY

Louis Wilputte, New York, N. Y., assignor to Allied Chemical & Dye Corporation, a corporation of New York Application June 6, 1944, Serial No. 538,977

8 Claims. (Cl. 202—141)

The present invention relates to the construction and operation of a coke oven battery of the underfired type.

The chief object of the present invention is to provide a regenerative underfired coke oven battery of somewhat more simple design than known batteries of this type and which can be efficiently operated so that moderate temperature conditions always prevail in the basement space. More specifically, it is an object of this invention to maintain temperature conditions in the basement space of such batteries such that it is always reasonably comfortable for the attendant moving around therein to operate the regulating devices for controlling the flow of fuel gas to the heating flues while avoiding during winter conditions such low temperatures as would cause undesirable condensation of constituents in the fuel gas mains to take place. Other objects and advantages of this invention will be apparent from the following detailed description.

Patent 2,155,954 of April 25, 1939, discloses a regenerative coke oven battery of the underfired type, in which the end walls of the battery are provided with louvres or other control inlets for the admission of air to the basement space to regulate temperature conditions therein. The air thus admitted to the basement space and preheated therein supplies only a portion of the air fed to the regenerators, the remainder of the air being supplied from the alleys at the sides of the battery. While the invention of this patent is an advance in the art of regenerative underfired coke ovens, in operation it has been found that the admission of air from the opposite ends of the battery into the basement space does result in certain practical difficulties. For example, during winter conditions the admission of air into the basement space in this manner at times results in excessively low temperatures in the portion of the basement space at the ends of the battery, with consequent chilling of the fuel gas mains disposed in this portion of the basement space resulting in undesired condensation within these mains. The present invention may be regarded as an improvement on the invention of this patent.

In accordance with a preferred embodiment of this invention, the battery has a single chimney flue located along one side thereof communicating with the regenerators. In the side wall of the basement space at the other side of the battery, pairs of regulatable openings or louvres are provided, one opening of each pair communicating with the upper portion of the basement space and the other opening with the lower portion. These pairs of openings are spaced longitudinally of the battery. All the air required for the combustion of the fuel gas is thus supplied from one side only of the battery and caused to flow through the full width of the basement space thereby cooling this space; the preheated air flows from the basement space into the regenerators.

During winter conditions of operation the valves controlling the flow through the upper openings may be entirely or partially closed so that all or a major portion of the air enters through the bottom openings and sweeps across the basement space into the passageways leading to the regenerators. This avoids excessive cooling of the upper portion of the basement space where the fuel gas mains are located thereby preventing undesirable condensation from taking place therein. During summer conditions of operation all or a major portion of the air may be admitted through the top openings, the valves controlling the flow of air to the bottom portion being partially or completely closed, thereby sweeping out of the upper portion of the basement space the hot air which would otherwise remain there and resulting in the maintenance of reasonably comfortable temperatures for the attendant operating the regulating devices disposed in the basement space. By suitably positioning the valves controlling the flow of air into each pair of openings, the amount of air admitted through the top and bottom openings may be proportioned to maintain the desired temperature conditions in the basement space, notwithstanding variations in atmospheric temperature conditions due to seasonal or other factors.

In the accompanying drawings forming a part of this specification and showing for purposes of exemplification a preferred embodiment of the invention, but without limiting the claimed invention to this embodiment:

Figure 1 shows a vertical section taken crosswise of a battery, the left-hand portion of the figure being through a coking chamber and the right-hand portion through a heating wall of a coke oven battery embodying the present invention;

Figure 2 is a fragmentary vertical section taken lengthwise of the battery on the line 2—2 of Figure 1;

Figure 3:
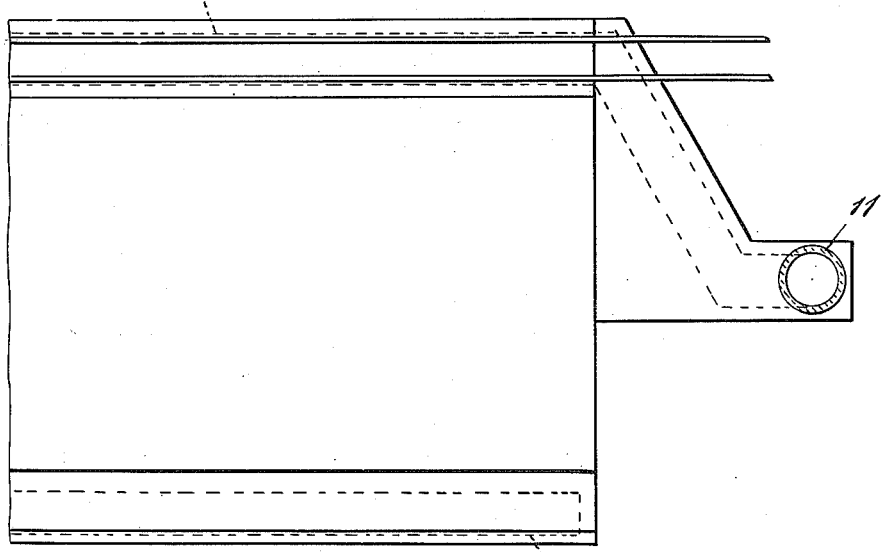
Figure 3 is a fragmentary diagrammatic plan view of the battery showing the single chimney flue leading to a stack.

Referring to the drawings, the coke oven battery structure illustrated in Figures 1 and 2 comprises a deck or oven base member 1 which extends for the full length and width of and supports the battery brickwork. In the upper portion of this brickwork are transversely extending coking chambers 2 and heating walls 3 alternating with the coking chambers. In the lower portion of this oven battery structure are transversely extending or cross regenerators 4 each constituted of a middle section 4a and outer sections 4b and 4c and regenerator sole channels or passages 5 which extend into the oven brickwork from one side of the battery and through which air is supplied to and products of combustion are withdrawn from the bottom of the regenerators.

The deck member 1 is ordinarily formed of reinforced concrete and may be a single slab, although preferably it is divided into a plurality of longitudinal sections separated by expansion joints, as disclosed in Patent No. 2,088,532, granted July 27, 1937. The deck member 1 is supported mainly by a multiplicity of vertical columns 6, which may be of reinforced concrete. These columns are disposed longitudinally of the battery, preferably beneath alternating regenerators disposed lengthwise of the battery, as shown in Figure 2, and also crosswise of the battery. Masonry walls 7 and 8 are disposed at the sides of the battery. Suitable angle irons or masonry closures may be provided between these walls and deck 1 so that the joints therebetween are closed against the entrance of air into the basement space 9. Conventional pinion walls, not shown, are provided at the ends of the battery for additionally supporting the deck member and for retaining in place the ends of the brickwork supported on the deck member.

At one side of the battery is a chimney flue 10 which, as shown on Figure 3, communicates with a stack or chimney 11. This chimney flue runs the full length of the battery and is communicably connected with the regenerators, as hereinafter more fully described. It is constructed of masonry, one wall thereof being defined by the aforesaid masonry wall 7. Located at the same side of the battery as the chimney flue are reversing valves 12, which may take various forms and which collectively provide for the discharge of waste heat gases from the regenerators 4 through the sole channels 5 to the chimney flue 10 and for the supply of air to the regenerators through passageways 13 communicably connecting the basement space 9 with the sole flues 5. In the structure shown on Figure 1 a valve 14 controls the flow of air from the basement space 9 through the passageway 13 into the sole channel 5 of each regenerator section 4a. This valve is shown in closed position in Figure 1 because the middle regenerator section 4a with which the sole flue 5 communicates is operative for outflow of products of combustion and hence air is not being supplied thereto. A valve 15 is provided for controlling the flow of products of combustion from each sole flue 5 communicating with regenerator sections 4a. This valve is shown in open position in Figure 1 because, as above noted, the middle regenerator sections are shown operative for outflow of products of combustion. A butterfly valve 16 is positioned in the passageway 17 connecting each sole flue 5 with the chimney flue 10, which butterfly valve may be suitably positioned by the operator to obtain the desired stack draft causing flow of products of combustion into the chimney flue.

It will be understood that valves similar to 14, 15 are provided for the sole channels communicating with the regenerator sections 4b and 4c, which valves control the flow of air into regenerator sections 4b and 4c from the basement space and the outflow of products of combustion from these regenerator sections into chimney flue 10. Thus, when the valves 14 controlling the flow of air into the middle regenerator sections 4a along the length of the battery are closed, the corresponding valves controlling the flow of air into the regenerator sections 4b and 4c are open. Likewise, when the valves 15 controlling the flow of products of combustion from middle regenerator sections 4a into the chimney flue are open, the corresponding valves in the passageways connecting the sole channels to the outer regenerator sections 4b and 4c with the chimney flue are closed. Each passageway connecting the basement space with a sole channel may be provided with a port that may be throttled by removable and replaceable finger bars 13a. For a more complete description of the arrangement of regenerators, sole channels and their connection to the chimney flue, reference may be had to Davis Patent 2,334,612 of November 16, 1943.

Each coking chamber 2 is preferably provided with a plurality of charging holes 18, and with a passageway 19 leading into an uptake pipe 20 which communicates with a conventional collector main 21. As is well known in the art, a suitable valve, not shown, may be employed for controlling flow through the uptake pipe 20. The ends of the coking chamber, as conventional, are adapted to be closed by removable doors 22, which may be of the self-sealing type.

The heating walls 3 are formed with vertical heating flues 23 having in alternate flues high and low burners 24, 25 respectively. Each flue is connected at its lower end with the appropriate regenerator section 4a, 4b or 4c, as the case may be.

The particular character or form of the heating flues and the regenerators communicating therewith constitute no part of the present invention, but may take any usual form. The particular structure shown in the drawing comprises two exterior groups of flues and one interior group of flues communicating with the exterior regenerator sections 4b and 4c and the interior regenerator section 4a respectively. Reference may be had to the aforesaid Davis Patent 2,334,612 of November 16, 1943 for a more detailed disclosure of this heating flue and regenerator construction.

Each flue 23 receives fuel gas through an individual uprising channel 26 extending through the deck 1 and connected at its lower end with one of a pair of gas distribution mains 27, 28 (Figure 2) disposed in the basement space 9 near the top thereof crosswise of the battery. As appears from Figure 2, these crosswise extending mains 27, 28 are positioned beneath the heating walls 3. Each main 27 is provided with individual uprising channels 26 communicating only with the interior group of flues in a heating wall thereabove. Each main 28 is provided with individual uprising channels 26 communicating only with the exterior groups of flues in a heating wall thereabove; as shown in Figure 1, the portion of this main beneath the interior group of flues is devoid of uprising channels.

Each uprising channel 26, at the point where it is connected with main 27 or 28, as the case may be, is provided with a flow regulator 29 for controlling the flow of gas supplied to the flue. This flow regulator preferably is of the type described and claimed in Patent 2,199,961 of May 7, 1940. These regulating devices require attention and occasional adjustment by an attendant working in the basement space.

Figure 4:
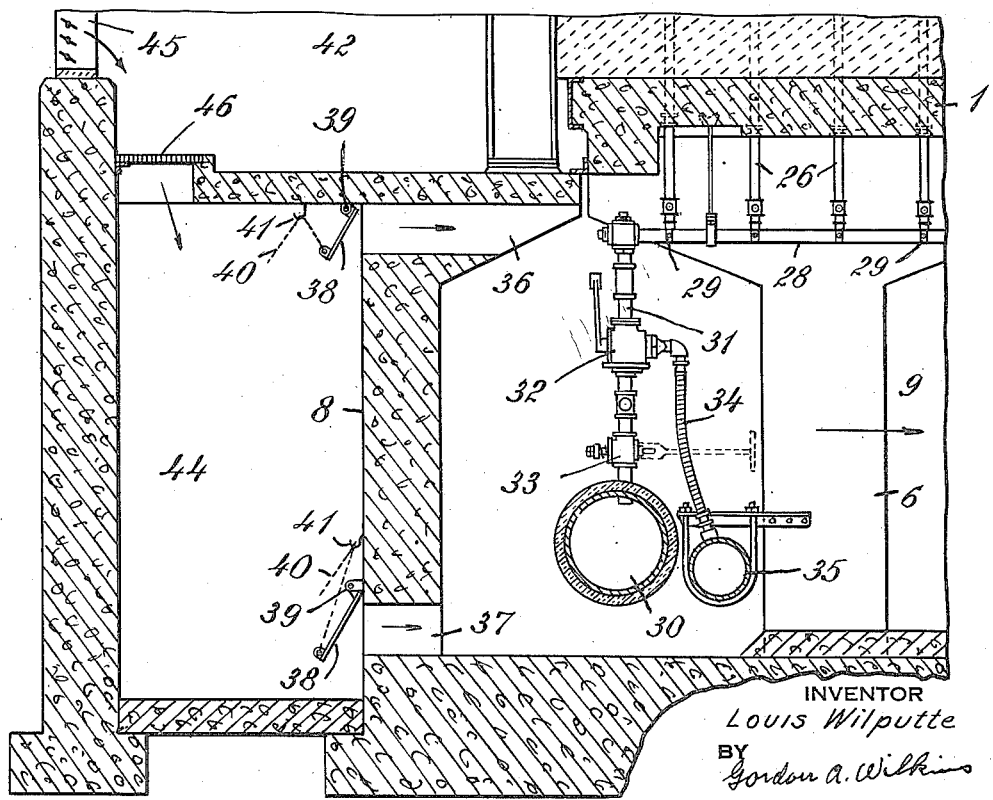
Figure 4 is an enlarged fragmentary vertical section through the basement space of the battery.

Each main 27, 28 communicates with a fuel gas supply main 30 (Figure 4) connected therewith by means of piping 31. Main 30 is suitably insulated against loss of heat. Piping 31 is provided with a three-way valve 32 and a shut-off valve 33 which is normally open, but may, if desired, be closed to prevent flow of gas from main 30 to the crossover mains 27, 28. Leading into the three-way valve 32 is flexible pipe 34, which communicates with a decarbonizing air main 35 suitably supported in the basement space 9. Operation of the three-way valve 32 by usual automatic reversal mechanism functions to place the main 30 into communication with either main 27 or 28 and to place the decarbonizing air main 35 into communication with these mains 27, 28 when fuel gas is not being supplied thereto. Upon reversal of operation the three-way valve 32 is operated to place decarbonizing air main 35 in communication with the cross mains 27 or 28, to which previously fuel gas had been supplied in accordance with customary procedure of supplying fuel gas and decarbonizing air to the gas distribution system of coke oven batteries.

Formed in the side wall 8 at one side of basement space 9 are pairs of openings 36, 37 (Figure 4), opening 36 communicating with the upper portion of the basement space and opening 37 with the lower portion of this space. These pairs of openings, as appears from Figure 2, are arranged beneath alternating regenerators lengthwise of the battery, i. e. between the cross rows of pillars 6. Thus, the space directly opposite the openings 36 and 37 is substantially unobstructed. Each opening is provided with a suitable valve closure 38, which may be pivoted as at 39 and operated by a chain 40 so that the valve may be completely closed or left open to any desired extent. A hook 41 is provided for each valve 38 to engage a link of the chain 40 to maintain the valve open to the desired extent. If it is desired to close the opening 36 or 37, this may readily be accomplished by detaching the chain 40 from the hook 41, whereupon the weight of the valve 38 will cause it to assume a closed position. Instead of valves 38 operable individually, two sets of valves may be used, one set controlling the top openings 36 and the other the bottom openings 37, all the valves of each set being operable simultaneously by a cable or bar disposed along the length of the battery and adapted to be hand or power actuated from one end of the battery.

Air is supplied to the openings 36 and 37 through the alleyway 42 disposed beneath the bench 43 directly above the sub-alley 44 contiguous to the basement space 9. Louvres 45 are provided in the side wall of the alleyway 42 through which air enters and flows down through louvres 46 in the base of this alleyway into the sub-alley 44. If desired, sub-alley 44 may be eliminated and individual valve-controlled conduits provided for supplying air from the atmosphere or alley 42 to each of the air ducts 36, 37.

Depending upon atmospheric temperature conditions, the valves controlling flow through some or all of the openings 36, 37 may be partially or completely opened. The air thus enters through these openings, sweeps across the bottom of the basement space 9 across the full width thereof into the passageways 13 leading into the sole flues 5 of the regenerators.

An alley 47 at the other side of the battery is provided with louvres 48 in the front wall thereof to permit circulation of air through this alley. It should be noted that the air thus circulated does not enter into the basement space 9.

In operation during summer conditions the valves controlling openings 36 are maintained open to the fullest extent and the valves controlling openings 37 are closed or substantially completely closed, so that all or the major portion of the air enters near the top of the basement space 9 and sweeps out the hot gases at the top thereof. A moderate temperature is thus maintained in this space throughout the full height thereof. In winter temperatures, however, it is preferred to partially or completely close the valves 38 controlling flow through openings 36 so that little or no air enters through the openings at the top of the basement space, thereby avoiding excessive cooling of the mains 27, 28 which would cause condensation to take place therein. The extent to which each of the valves 38 controlling the top and bottom openings 36, 37 are opened or closed will depend upon the temperature conditions prevailing. Thus, at unusually low winter temperatures the valves controlling the top openings should be completely closed and all the air admitted through the bottom openings 37. At unusually high summer temperatures the valves controlling the bottom openings 37 should all be closed and all the air admitted through the top openings 36. At temperatures above low winter temperatures but below peak summer temperatures, the valves controlling the top and bottom openings may be opened to the desired extent to proportion the flow through the top and bottom openings and obtain a satisfactory operating temperature in the basement space.

It will be noted that the preferred embodiment of the invention involves a single chimney flue at one side of the battery, valves for controlling flow into and out of the regenerators also at one side only of the battery, and the introduction of all the air fed to the regenerators from the other side of the battery, the air flowing through the full width of the basement space where it is preheated and then entering the regenerators. Hence, the oven battery in construction and operation is simpler in design and less costly to construct than prior designs involving two chimney flues and regenerator flow regulating devices at both sides of the battery. Furthermore, this invention results in more satisfactory cooling of the basement space without, however, resulting in such low temperatures near the top of the basement space as would result in undesirable condensation in the gas mains located therein.

While the invention has been described in connection with a coke oven adapted to be fired by rich fuel gas only, the invention is not limited thereto but comprehends combination coke oven batteries equipped with underfired burners and adapted to be fired not only with rich fuel gas such as coke oven gas but also with lean gas such as blast furnace gas or producer gas as disclosed, for example, in Pavitt Patent 2,098,013 of November 2, 1937. Accordingly, it will be understood the invention as hereinabove set forth

I claim:

1. In an underfired coke oven battery, the combination with a coke oven structure having coking chambers and heating flues for heating the same and regenerators communicating with said heating flues, of a sub-structure supporting said oven structure and formed with a basement space underlying substantially the entire coke oven structure, a side wall of said oven structure defining a side wall of said basement space and having a plurality of air inlets disposed in spaced relation along the length of said side wall and communicating with the upper portion of said basement space and also having a plurality of air inlets disposed in spaced relation along the length of said side wall and communicating with the lower portion of said basement space, valves for controlling flow through said air inlets, and means extending through the opposite side wall of the battery for communicably connecting the basement space with said regenerators, whereby air flows through said inlets completely across said basement space into the regenerators and thence into the communicating heating flues to support combustion of gas in said flues.

2. In an underfired coke oven battery, the combination with a coke oven structure having coking chambers and heating flues for heating the same and regenerators communicating with said heating flues, of a sub-structure supporting said oven structure and formed with a basement space underlying substantially the entire coke oven structure, a side wall of the oven structure defining a side wall of the basement space and having a plurality of pairs of air inlets communicating with the said basement space, one inlet of each pair being disposed to communicate with the upper portion of said basement space and the other inlet of the pair being disposed to communicate with the lower portion of said basement space, said pairs of inlets being disposed at spaced intervals along the length of the side wall of the oven structure, means extending through the opposite side wall of the battery for communicably connecting the basement space with said regenerators, whereby air flows through said inlets completely across said basement space into the regenerators and thence into the communicating heating flues to support combustion of gas in said flues, a gas main for supplying fuel gas to the heating flues disposed in said basement space, means including regulating devices accessible for adjustment by an attendant moving around in said space for controlling the flow of fuel gas to said heating flues, and valve means for controlling flow of air through said inlets into said basement space constructed and arranged so that the top inlets only or bottom inlets only or all inlets may supply air to the basement space, whereby notwithstanding variation in atmospheric temperature conditions the basement space is maintained at a reasonably comfortable temperature for the said attendant operating said regulating devices, while maintaining the temperature in said basement space at a point such that condensation does not take place in the said gas main disposed therein.

3. In an underfired coke oven battery, the combination with a coke oven structure having coking chambers and heating flues for heating the same and regenerators communicating with said heating flues, of a sub-structure supporting said oven structure and formed with a basement space underlying substantially the entire coke oven structure, a gas main for supplying fuel gas to the heating flues disposed in said basement space, means including regulating devices accessible for adjustment by an attendant moving about in said basement space for supplying fuel gas to said heating flues from said gas main, means for controlling the temperature in said space, comprising a plurality of air inlet openings disposed in a side wall of the oven structure defining a side wall of the basement space, some of said openings communicating with the top portion of said basement space and the remainder of said openings communicating with the lower portion of said basement space, means at the opposite side of the oven structure from that containing said air inlet openings connecting said basement space with said regenerators, and means for passing air thus supplied through said air inlet openings to the basement space completely across said basement space into the regenerators and thence into the communicating flues to support combustion of gas in said flues.

4. In an underfired coke oven battery, the combination with a coke oven structure having coking chambers and heating flues for heating the same and regenerators communicating with said heating flues, of a sub-structure supporting said oven structure and formed with a basement space underlying substantially the entire coke oven structure, a gas main for supplying fuel gas to the heating flues disposed in said basement space, means including regulating devices accessible for adjustment by an attendant moving about in said basement space for supplying fuel gas from said main to said heating flues, means for controlling the temperature in said space, comprising a plurality of air inlet openings disposed in a side wall of the oven structure defining a side wall of the basement space, some of said openings communicating with the top portion of said basement space and the remainder of said openings communicating with the lower portion of said basement space, means at the opposite side of the oven structure from that containing said air inlet openings connecting said basement space with said regenerators, means for passing air thus supplied through said air inlet openings to the basement space completely across said basement space into the regenerators and thence into the communicating flues to support combustion of gas in said flues, and means for opening and closing said openings so that air may be supplied through either the openings communicating with the top portion of the basement space or those communicating with the lower portion of said basement space, depending upon atmospheric temperature conditions, to maintain the temperature in the basement space at a point such that it is reasonably comfortable for the attendant.

5. In an underfired coke oven battery, the combination with a coke oven structure having coking chambers, heating flues for heating the same, and regenerators communicating with said heating flues, of a sub-structure supporting said oven structure and forming a basement space underlying substantially the entire coke oven structure, a single chimney flue disposed along one side of the battery communicating with said regenerators, the side wall of the battery opposite to that at which the said chimney flue is located being provided with a plurality of pairs of openings, said pairs of openings being disposed along the side wall of said battery in spaced relation so that one pair of openings is provided for each pair of regenerators disposed along the length of the battery, one opening of each of said pairs communicating with the upper portion of the basement space and the other opening communicating with the lower portion, means including gas main and regulating devices accessible for adjustment by an attendant moving about in said basement space for the supplying fuel gas to said heating flues, means at the side of the battery at which the said single chimney flue is located connecting said basement space with said regenerators, and valve means for controlling the flow of air through each pair of openings in said basement space, whereby the air flows completely across the said basement space into the regenerators and thence into the communicating flues to support combustion of gas in said flues.

6. In an underfired coke oven battery, the combination with a coke oven structure having coking chambers, heating flues for heating the same and regenerators communicating with said heating flues, of a sub-structure supporting said oven structure and forming a basement space underlying substantially the entire coke oven structure, a single chimney flue disposed along one side of the battery communicating with said regenerators, an air duct disposed along the opposite side wall of the battery contiguous to the basement space and separated from said basement space by a wall, said wall being provided with a plurality of pairs of openings, said pairs of openings being disposed along the said wall in spaced relation, one opening of each of said pairs communicating with the upper portion of the basement space and the other opening communicating with the lower portion, and connections between said basement space and the regenerators on the side of the battery at which said single chimney flue is disposed, whereby air introduced through said openings passes completely across the basement space through said connections and flows into the regenerators.

7. In an underfired coke oven battery, the combination with a coke oven structure having coking chambers, heating flues for heating the same and regenerators communicating with said heating flues, of a sub-structure supporting said oven structure and forming a basement space underlying substantially the entire coke oven structure, a single chimney flue disposed along one side of the battery communicating with said regenerators, the side wall of the battery opposite the side at which the said chimney flue is disposed being provided with a plurality of air inlet openings disposed at spaced intervals along the length of the battery some of which openings communicate with the upper portion of said basement space and the remainder of which communicate with the lower portion of said basement space, the side wall of the battery at which the said single chimney flue is disposed having connections therein communicably connecting said basement space with said regenerators, and means for supplying air to the basement space through said openings, the air flowing completely across said basement space through said connections into the regenerators and thence into the communicating flues to support combustion of gas in said flues.

8. In an underfired coke oven battery, the combination with a coke oven structure having coking chambers and heating flues for heating the same and regenerators communicating with said heating flues, of a sub-structure supporting said oven structure and formed with a basement space underlying substantially the entire coke oven structure, a side wall of said oven structure defining a side wall of said basement space and having a plurality of air inlets communicating with said basement space, some of said inlets being disposed in spaced relation along the length of said side wall and communicating with the top of said basement space and the remainder of said inlets being disposed in spaced relation along the length of said side wall and communicating with the bottom thereof for supplying air to said basement space, valves for controlling flow through said air inlets, and means at the opposite side of said battery connecting said basement space with the regenerator, whereby air flows through said inlets completely across said basement space into the regenerators and thence into the communicatinng flues to support combustion of gas in said flues.

LOUIS WILPUTTE.

REFERENCES CITED

The following references are of record in the file of this patent:

UNITED STATES PATENTS

| Number | Name | Date |
|---|---|---|
| 666,859 | Bosley | Jan. 29, 1901 |
| 1,151,692 | Knappen | Aug. 31, 1915 |
| 2,098,013 | Pavitt | Nov. 2, 1937 |
| 2,102,609 | Becker | Dec. 21, 1937 |
| 2,155,954 | Pavitt | Apr. 25, 1939 |
| 2,306,366 | Becker | Dec. 29, 1942 |
| 2,306,678 | Van Ackeren | Dec. 29, 1942 |
| 2,309,028 | Tweit | Jan. 19, 1943 |

FOREIGN PATENTS

| Number | Country | Date |
|---|---|---|
| 187,379 | Germany | July 18, 1907 |
| 213,706 | Germany | Oct. 5, 1909 |
| 233,801 | Germany | Apr. 21, 1911 |
| 387,575 | Germany | Dec. 29, 1923 |
| 477,434 | Germany | June 13, 1929 |
| 497,972 | Germany | May 16, 1930 |